US011005139B2

(12) United States Patent
Nandi et al.

(10) Patent No.: US 11,005,139 B2
(45) Date of Patent: May 11, 2021

(54) MAT MADE OF GLASS FIBERS OR POLYOLEFIN FIBERS USED AS A SEPARATOR IN A LEAD-ACID BATTERY

(71) Applicant: JOHNS MANVILLE, Denver, CO (US)

(72) Inventors: Souvik Nandi, Highlands Ranch, CO (US); Zhuhua Guo, Ottawa Hills, OH (US); Jawed Asrar, Englewood, CO (US); Albert G Dietz, III, Davidson, NC (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/527,223

(22) Filed: Jul. 31, 2019

(65) Prior Publication Data

US 2019/0355949 A1 Nov. 21, 2019

Related U.S. Application Data

(62) Division of application No. 13/445,073, filed on Apr. 12, 2012, now Pat. No. 10,411,236.

(51) Int. Cl.
*H01M 50/44* (2021.01)
*H01M 10/06* (2006.01)
*H01M 50/431* (2021.01)
*H01M 50/409* (2021.01)
*H01M 50/411* (2021.01)
*H01M 50/449* (2021.01)

(52) U.S. Cl.
CPC ........... *H01M 50/44* (2021.01); *H01M 10/06* (2013.01); *H01M 50/409* (2021.01); *H01M 50/411* (2021.01); *H01M 50/431* (2021.01); *H01M 50/449* (2021.01)

(58) Field of Classification Search
CPC .. H01M 2/1613; H01M 2/162; H01M 2/1686; H01M 2/1666; H01M 10/06
See application file for complete search history.

(56) References Cited

U.S. PATENT DOCUMENTS

| 3,910,799 A | 10/1975 | Kondo et al. |
| 4,216,280 A | 8/1980 | Kono et al. |
| 4,336,314 A | 6/1982 | Yonezu et al. |
| 4,606,982 A | 8/1986 | Nelson et al. |
| 4,873,157 A | 10/1989 | Flicker et al. |
| 5,667,917 A | 9/1997 | Edwards et al. |
| 9,118,063 B2 | 8/2015 | Guo et al. |
| 2008/0076028 A1 | 3/2008 | Miller et al. |
| 2011/0039161 A1 | 2/2011 | Torata et al. |
| 2011/0216476 A1 | 9/2011 | Fleischer et al. |
| 2011/0256443 A1 | 10/2011 | Park et al. |
| 2011/0293988 A1 | 12/2011 | Obemyer et al. |
| 2011/0318643 A1 | 12/2011 | Clement et al. |
| 2012/0070713 A1 | 3/2012 | Whear et al. |
| 2012/0244429 A1 | 9/2012 | Lam et al. |

FOREIGN PATENT DOCUMENTS

| DE | 20 2004 020668 U1 | 1/2006 |
| EP | 0 507 090 A1 | 10/1992 |
| EP | 2 390 947 A1 | 11/2011 |
| FR | 2937799 A1 | 4/2010 |
| JP | 359033754 A | 2/1984 |
| WO | 2011029130 A1 | 3/2011 |
| WO | 2012177869 A2 | 12/2012 |
| WO | 2013053957 A1 | 4/2013 |

*Primary Examiner* — Ladan Mohaddes
(74) *Attorney, Agent, or Firm* — Robert D. Touslee

(57) ABSTRACT

Embodiments of the invention provide methods and apparatuses for enhancing electron flow within a battery, such as a lead-acid battery. In one embodiment, a battery separator may include a conductive surface or layer upon which electrons may flow. The battery separator may include a fiber mat that includes a plurality of electrically insulative fibers. The battery separator may be positioned between electrodes of the battery to electrically insulate the electrodes. The battery separator may also include a conductive material disposed on at least one surface of the fiber mat. The conductive material may contact an electrode of the battery and may have an electrical conductivity that enables electron flow on the surface of the fiber mat.

20 Claims, 3 Drawing Sheets

MAT MADE OF GLASS FIBERS OR POLYOLEFIN FIBERS USED AS A SEPARATOR IN A LEAD-ACID BATTERY

CROSS-REFERENCE TO RELATED APPLICATION

This application is a division of pending U.S. application Ser. No. 13/445,073 filed Apr. 12, 2012. The entire contents of the above-identified application are herein incorporated by reference for all purposes.

BACKGROUND OF THE INVENTION

The present invention relates generally to battery separators, and more specifically to battery separators having a conductive layer or surface.

Batteries, such as lead-acid batteries, are commonly used for various purposes and in various equipment. For example, a common use of lead-acid batteries is in the automotive industry where the batteries are used to power a starter motor to rotate an internal combustion engine and initiate operation of an automobile. Other common applications of the lead-acid battery in automobiles includes powering various components or equipment, such as CD players, lights, power terminals, and the like. The use of and dependence on batteries is increasing in automobiles as such vehicles become less reliant on petroleum as a means for powering the vehicle and more reliant on alternative energies. Currently, many automobiles are produced that are either powered entirely on electricity or by a hybrid power, such as a combination of electricity and petroleum. These automobiles often have increased electrical current and battery discharge time requirements compared to other applications. Batteries are also commonly used for various other industrial or recreational purposes, such as to power industrial equipment, appliances, toys, and the like.

The use of and dependence on batteries will likely continue to increase in the future. As such, there is a continued need for improved means for providing batteries with expanded power output and/or increased battery life.

BRIEF SUMMARY OF THE INVENTION

Embodiments of the invention provide battery separators having an electrically conductive surface to enhance electron flow on the surface or surfaces of the battery separator and thereby extend a battery's life. According to one embodiment, a lead-acid battery is provided. The lead-acid battery may include a positive electrode, a negative electrode, and a fiber mat positioned between the positive and negative electrode and separating the electrodes to electrically insulate the electrodes. The fiber mat may include a plurality of fibers and a conductive material disposed on at least one of its surfaces. The conductive material may contact the positive or the negative electrode and may have an electrical resistant of less than about 100,000 ohms per square to enable electron flow on the surface of the fiber mat.

In one embodiment, the conductive material may have an electrical resistant of less than about 50,000 ohms per square. According to several embodiments, the conductive material may comprise several configurations including: a conductive material coating applied to the at least one surface of the fiber mat, a conductive fiber mat positioned adjacent the at least one surface of the fiber mat, a plurality of conductive polymers interwoven within the fiber mat and/or positioned atop the mat, and the like. The fiber mat may also include an additional conductive material disposed on the other surface of the fiber mat so that both the positive and negative electrodes contact one of the respective conductive materials.

According to another embodiment, a battery separator is provided. The battery separator may include a mat that includes a plurality of electrically insulative fibers. The mat may be configured to separate electrodes of a battery to electrically insulate the electrodes. A conductive material may be disposed on at least one surface of the mat and may contact one of the electrodes of the battery. The conductive material may enable electron flow on the surface of the mat.

The battery separator may also include a microporous membrane disposed on a surface opposite the conductive material. In one embodiment, a second mat may be disposed on a surface of the microporous membrane opposite the first mat so that the microporous membrane is sandwiched between the mats. A second conductive material may be disposed on an outer surface of the second mat so such that the second conductive material contacts a second electrode of the battery. Similar to the first mat, the second conductive material may have an electrical conductivity that enables electron flow on the surface of the second mat.

In some embodiments, the first and/or conductive material may include: conductive polymers, nanocarbons, a metal, copper, titanium, vanadium, graphite, graphene, and the like. In one embodiment, the mat is a glass mat and the conductive material is a coating applied to the glass mat. The coating may include a mixture of a binder and the conductive material. In another embodiment, the mat is a glass mat and the conductive material is a second mat that includes a plurality of conductive fibers where the second mat is positioned adjacent the mat.

According to another embodiment, a nonwoven fiber mat having a conductive surface is provided. The nonwoven fiber mat includes a plurality of entangled fibers that form the nonwoven fiber mat, a binder that facilitates in coupling the plurality of entangled fibers, and a layer of conductive material disposed on at least one surface of the plurality of entangled fibers. The conductive material has an electrical conductivity sufficient to provide the conductive surface of the nonwoven glass fiber mat.

According to another embodiment, a method of providing a battery separator having a conductive surface is provided. The method may include providing a fiber mat comprising a plurality of electrically insulative fibers and applying a conductive material to at least one surface of the fiber mat. The conductive material may form a conductive layer on the surface of the fiber mat and the conductive layer may have an electrical conductivity that enables electron flow on the surface of the fiber mat. In one embodiment, the conductive material may have an electrical resistance of less than about 100,000 ohms per square while in another embodiment the conductive material has an electrical resistance of less than about 50,000 ohms per square.

The method may also include positioning the battery separator between a positive electrode and a negative electrode of a battery so that the conductive layer contacts one of the electrodes to enhance electron flow with respect to the contacted electrode. In one embodiment, the step of applying the conductive material to the at least one surface of the fiber mat includes applying a coating of conductive material to the plurality of fibers. The coating of conductive material may include a binder mixed with the conductive material. The fiber mat may be saturated with the binder and/or the binder may be sprayed atop the at least one surface of the fiber mat. In another embodiment, the step of applying the conductive material to the at least one surface of the fiber mat includes positioning a second fiber mat adjacent the surface of the fiber mat. The second fiber mat may include a plurality of conductive fibers and/or a plurality of fibers coated with a conductive material.

The method may further include positioning a microporous membrane on an opposite surface of the fiber mat. The method may additionally include positioning a positive electrode conductor adjacent a surface of a positive electrode and positioning the battery separator adjacent the positive electrode so that the conductive layer contacts the positive electrode. The positive electrode may be disposed between the fiber mat and the positive electrode conductor so that electrons at a first region of the positive electrode flow along the conductive layer of the fiber mat to a positive terminal of the battery when the conductive layer provides an electrical path of minimal resistance at the first region. Electrons at a second region of the positive electrode may flow along the positive electrode conductor to the positive terminal of the battery when the positive electrode conductor provides an electrical path of minimal resistance at the second region.

BRIEF DESCRIPTION OF THE DRAWINGS

Embodiments of the present invention are described in conjunction with the appended figures.

Figure 1:
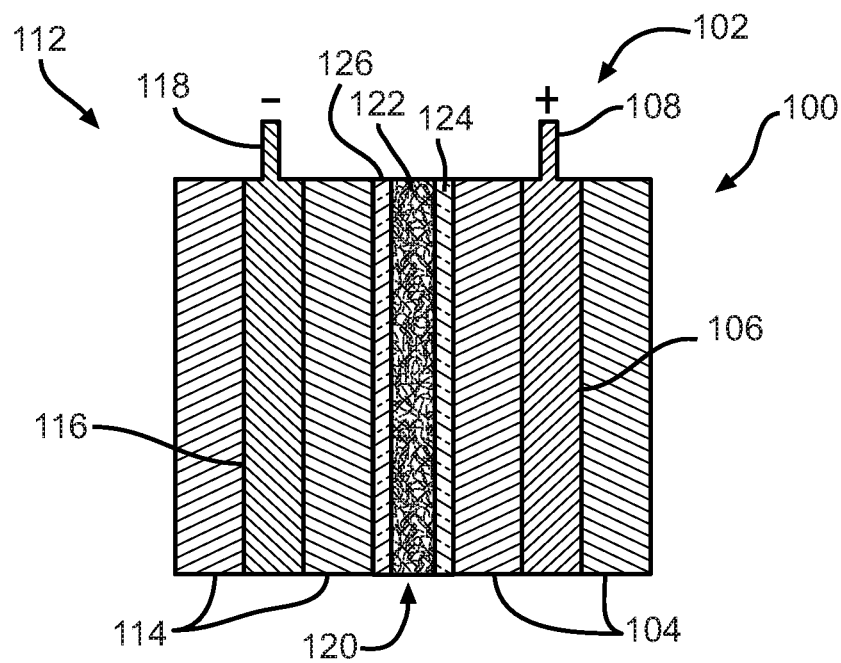
FIG. 1 illustrates a cross section view of a battery cell having positive and negative electrodes separated by a battery separator including a conductive surface or layer according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments of the invention provide battery separators having an electrically conductive surface to enhance electron flow on the surface or surfaces of the battery separator and thereby extend a battery's life. The battery separators described herein may be especially useful for prolonging the life of lead acid batteries where continual discharge of the battery results in degradation of the battery's electrodes. For example, during discharge of the lead acid battery, lead dioxide (a good conductor) in the positive electrode plate is converted to lead sulfate, which is generally an insulator. The lead sulfate can form an impervious layer or layers encapsulating the lead dioxide particles, which may limit the utilization of the lead dioxide, and thus the battery, to less than 50 percent of capacity, and in some cases about 30 percent. The insulative lead sulfate layer may also lead to higher resistance for the battery. The effect may be a decrease in the electrical current provided by the battery and/or in the discharge life of the battery.

The electrically conductive battery separator may improve or extend the life of the lead acid battery by improving electron flow or current within the battery. In some embodiments, an electrically conductive surface of the battery separator provides an additional route for the electrons to flow (i.e., an additional current route), the additional route being separate from the route provided by the conductor plate or grid of the battery. In other embodiments, electrons may flow on the electrically conductive surface of the battery separator or on the conductor plate or grid depending on which conductor provides the route or path of minimal resistance to battery terminal. In this manner, as the electrodes continually degrade due to formation of lead sulfate, the route or path of the electrons through the electrode and/or along the battery separator surface can adjust to compensate for the degradation.

The battery separator may include a fiber mat including a plurality of electrically insulative fibers. The fiber mat may have an electrical resistance greater than about 1 million ohms per square. The fiber mat may be a nonwoven porous mat where the plurality of fibers are entangled and/or coupled by a binder. In one embodiment, the fiber mat includes glass fibers, polyolefin fibers, polyester fibers, and the like. The glass, polyolefin, or polyester fiber mat may provide a reinforcement layer for the battery separator. The battery separator may also include a micoporous membrane or polymeric film positioned adjacent one surface of the fiber mat. The microporous membrane may include pores sized smaller than the fiber mat. The battery separator may prevent physical contact between positive and negative electrodes of the battery while enabling free ionic transport across the mat.

Positioned on a surface of the fiber mat opposite the microporous membrane may be an electrically conductive material that provides the fiber mat with an electrically conductive surface. The battery separator may be positioned within the battery so that the electrically conductive material/layer contacts one or more of the battery's electrodes. In some embodiments, the electrically conductive material includes a layer or mat of conductive fibers or a layer of other conductive materials, such as a metallic sheet or film. In other embodiments, the conductive material may include a coating of conductive material applied to or atop the fiber mat. In a specific embodiment, the conductive material is added to a binder material that is applied to the plurality of fibers during manufacture of the fiber mat or sprayed atop a previously manufactured fiber mat.

The electrically conductive layer of the fiber mat may be disposed across substantially the entire surface of the fiber mat so that the electrically conductive layer is substantially equivalent in size and shape to the fiber mat. In this manner the electrically conductive layer provides a large conductive surface that contacts the electrode and along which electrons may flow. The large conductive surface also provides virtually limitless paths or routes along which the electrons may flow as insulative lead sulfate is produced through repeated charge and discharge of the battery.

In some embodiments, the battery separator includes a conductive material or layer on both surfaces so that both the positive and negative electrodes of the battery contact a conductive surface of the battery separator. Having generally described several embodiments of the inventions, additional aspects of embodiments of the invention will be recognized with reference to the figures.

FIG. 1 illustrates a cross section of a cell 100 of a lead-acid battery. In one embodiments, the lead-acid battery may include 3 such cells 100 connected in series to provide about 6.3 volts. In another embodiment, the lead-acid battery may include 6 such cells 100 connected in series to provide about 12.6 volts. In still other embodiments the lead-acid battery may include more or less cells depending on the voltage needed.

Cell 100 includes a positive electrode 102 and a negative electrode 112. Positive electrode 102 includes a positive electrode conductor 106, such as a metal grid or plate, having a coating of positive active material, such as lead dioxide 104. Conductor 106 is electrically coupled with a positive terminal 108. Similarly, negative electrode 112 includes a negative electrode conductor 116, such as a metal grid or plate, having a coating of negative active material, such as lead 114. Conductor 116 is electrically coupled with a negative terminal 118. Positive electrode 102 and negative electrode 112 are immersed in an electrolyte (not shown) that may include sulfuric acid and water.

Separating positive electrode 102 and negative electrode 112 is battery separator 120. Battery separator 120 prevents physical contact of positive electrode 102 and negative electrode 112 while enabling ionic transport across battery separator 120, thus completing a circuit and allowing an electronic current to flow between positive terminal 108 and negative terminal 118.

Battery separator 120 include a porous fiber mat 122 that includes a plurality of electrically insulative fibers, such as glass, polyolefin, polyester, and the like. In one embodiment, fiber mat 122 is essentially non-conductive having an electrical resistance greater than about 1 Megohm per square. The low conductance of the fiber mat 122 electrically separates positive electrode 102 and negative electrode 112, or in other words prevents or minimizes an electronic current from passing between positive electrode 102 and negative electrode 112 and thereby shorting the circuit. In one embodiment, fiber mat 122 includes glass, polyolefin, or polyester fibers, or any combination thereof, that are coupled together via a binder. Glass, polyolefin, or polyester fiber mat 122 may be manufactured by removing (e.g., via a vacuum) liquid from a suspension of the fibers in the liquid medium. The binder is then applied to the wet-laid non-woven glass or polyolefin fibers to form fiber mat 122. In one embodiment, fiber mat 122 may have a thickness of between about 50 micrometers and about 500 micrometers, a porosity of between about 50 percent and about 90 percent, and have an average pore size of between about 5 micrometers and about 5 millimeters.

In other embodiments, the fibers of fiber mat 122 may include inorganic ceramics, or various polymers, such as polyvinylidene fluoride, polytetrafluoroethylene, polyamide, polyvinyl chloride, polyester, nylon, polyethylene terephthalate, and the like.

Positioned on one side of fiber mat 122 may be a conductive layer 124 formed by applying a conductive material to the surface of fiber mat 122. In the embodiment shown in FIG. 1, conductive layer 124 is positioned facing positive electrode 102, although in other embodiments conductive layer 124 may face negative electrode 112. The conductive material, and thus conductive layer 124 or surface of fiber mat 122, contact positive electrode 102, or more specifically the positive active material (e.g., lead dioxide 104) of positive electrode 102. The conductive material and/or conductive layer 124 has an electrical resistance of less than about 100,000 ohms per square and more commonly less than about 50,000 ohms per square so as to enable or enhance electron flow on the surface of the fiber mat 122. In some embodiments, conductive layer 124 may be electrically coupled with positive terminal 108 (or negative terminal 118 when positioned facing negative electrode 112) so as to provide a route or path for an electronic current to flow between positive electrode 102 (or negative electrode 112) and positive terminal 108 (or negative terminal 118) and/or a conductive element electrically coupled therewith. In other embodiments, electrons may flow along either fiber mat 122 or positive electrode conductor 106 depending on which conductive surface provides an electrical path of minimal resistance. For example, electrons proximate to positive terminal 108 may flow along an electrical path of the positive electrode conductor 106 while electrons distal to positive terminal 108 may flow along an electrical path of fiber mat 122 due to increase lead sulfate building on the positive electrode conductor 106 adjacent that location.

In one embodiment, conductive layer 124 is formed on the surface of fiber mat 122 by coating the conductive material onto fiber mat 122 or spraying the conductive material on the surface of fiber mat 122. For example, the conductive material may be added to a primary binder material that is applied to the wet-laid non-woven fibers to couple the fibers together. The primary binder/conductive material mixture and wet-laid non-woven fibers may then be cured so that the conductive material completely coats or is saturated throughout fiber mat 122 to form conductive layer 124. In another embodiment, fiber mat 122 may be manufactured in a standard process where a primary binder without the conductive material is applied to the wet-laid non-woven fibers to couple the fibers together. The conductive material may then be dispersed in a secondary or dilute binder that is then coated or sprayed onto the surface of fiber mat 122. Fiber mat 122 may then be cured so that the conductive material forms conductive layer 124 across a defined portion or the entire surface of fiber mat 122. In this embodiment, a majority of the conductive material may lay or be positioned atop the surface of fiber mat 122.

In another embodiment, a fiber mat 122 may be manufactured according to known process. A catalyst may be subsequently added to a surface of fiber mat 122 and metal ions, such as copper, may be grown on the surface of the fiber mat via the applied catalyst. In still another embodiment, the conductive material of conductive layer 124 may be added to fiber mat 122 via chemical vapor deposition processes.

In lead-acid battery environments, the conductive material used should be relatively corrosion resistant due to the aggressive electrochemical environment of the battery. In some embodiments, the conductive material may include a metal, a nanocarbon, graphene, graphite, a conductive polymer (e.g., polyanilines), nanocarbons or carbon nanotubes, copper, titanium oxides, vanadium oxides, tin oxides, and the like. In a specific embodiment, the conductive material include carbon nano-platelets, such as graphene. The graphene may be added to the primary binder or secondary/dilute binder as described above and applied to fiber mat 122 (e.g., a glass or polyolefin fiber mat) between about 0.5% and 50% by weight, or in some embodiments between about 1% and 10% by weight. When cured, the coating of graphene forms conductive layer 124 across a defined portion or the entire surface of fiber mat 122.

In another embodiment, conductive layer 124 comprises a conductive fiber mat, foil, or screen that is positioned adjacent the surface of fiber mat 122. In one embodiment, the conductive fiber mat may be made by coating the conductive material onto fiber mat 122 or spraying the conductive material on the surface of fiber mat 122. The foil or screen may include a metal, one or more conductive polymers, and the like. The conductive fiber mat may include a plurality of conductive fibers arranged in a nonwoven or woven pattern and coupled together via a binder. The conductive fiber mat may be coupled with fiber mat 122 via a binder and the like. Electrons may flow along the conductive fiber mat, foil, or screen as described herein, such as up to the positive and/or negative terminal or through lead dioxide 104 and/or lead 114. As described above, the conductive material of the conductive fiber mat, foil, or screen may include a metal, a nanocarbon, graphene, graphite, a conductive polymer (e.g., polyanilines), nanocarbons or carbon nanotubes, copper, titanium oxides, vanadium oxides, tin oxides, and the like.

Positioned on the opposite side of fiber mat 122 is a microporous membrane, such as a polymeric film 126 or an AGM (Absorbent Glass Mat). The polymeric film may be positioned adjacent negative electrode 112 and may include micro-sized voids that allow ionic transport (i.e., transport of ionic charge carriers) across battery separator 120. In one embodiment, microporous membrane or polymeric film 126 may have a thickness of 50 micrometers or less, and preferably 25 micrometers or less, may have a porosity of about 50% or 40% or less, and may have an average pore size of 5 micrometers or less and preferably 1 micrometer or less. Polymeric film 126 may include various types of polymers including polyolefins, polyvinylidene fluoride, polytetrafluoroethylene, polyamide, polyvinyl alcohol, polyester, polyvinyl chloride, nylon, polyethylene terephthalate, and the like.

Figure 2:
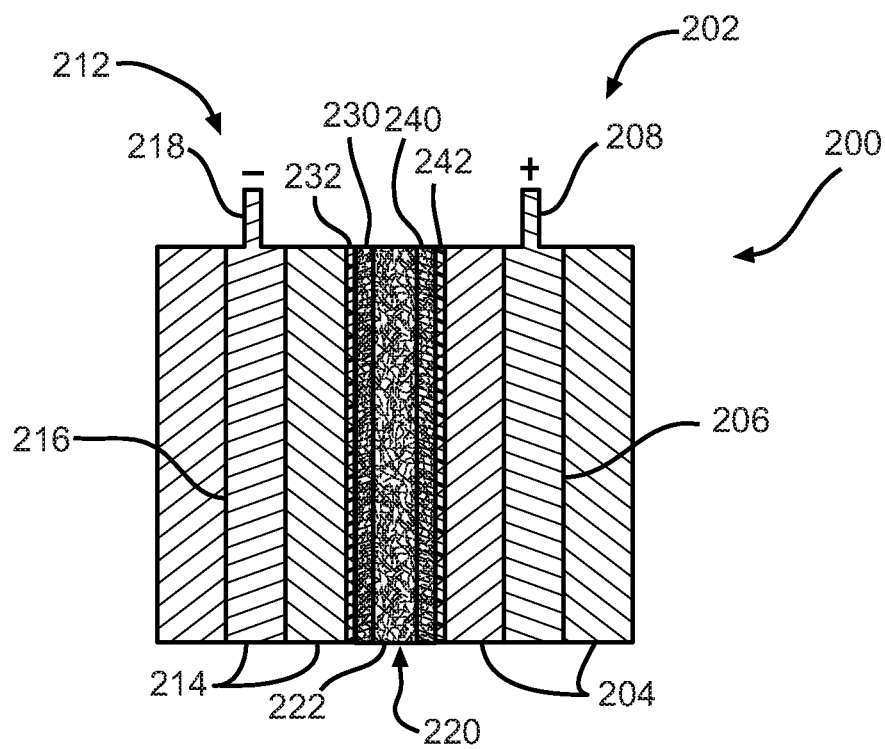
FIG. 2 illustrates a cross section view of another battery cell having positive and negative electrodes separated by a battery separator including a conductive surface or layer according to another embodiment of the invention.

Referring now to FIG. 2, illustrated is a cross section of another embodiment of a cell 200 having a positive electrode 202 and a negative electrode 212 separated by battery separator 220. Similar to cell 100, positive electrode 202 includes a positive electrode conductor 206, a positive active material, such as lead dioxide 204, and a positive terminal 208. Likewise, negative electrode 212 includes a negative electrode conductor 216, a negative active material, such as lead 214, and a negative terminal 218. Battery separator 220 includes a microporous membrane 222, such as the microporous membrane described above (e.g., a polymeric film). In some embodiments, element 222 represents a fiber mat (e.g., AGM or polyolefin mat) that does not have a conductive layer or surface. The glass/polyolefin mat or microporous membrane 222 has a negligible conductance (e.g., resistance of 1 Megohm per square or greater) such that electrons do not flow or transfer across the glass/polyolefin mat or microporous membrane 222. Positioned on each side of the microporous membrane 222 is a fiber mat, 230 and 240 respectively, such that microporous membrane (or alternatively a glass/polyolefin mat) 222 is sandwiched between the two fiber mats. Fiber mats 230 and 240 may include similar fiber materials, such as glass or polyolefin, or different fiber materials. Each fiber mat, 230 and 240, may be conductive or include a conductive layer, 232 and 242 respectively, so that both the negative electrode 212 and positive electrode 202 contact a conductive layer or surface of a respective fiber mat. As described herein, electrons may flow along or with respect to the conductive layers or surfaces, 232 and 242, of the fiber mats, 230 and 240 respectively. In another embodiment, only one of the fiber mats, 230 and 240, may be conductive or include a conductive layer. For example, both fiber mats, 230 and 240, may be glass or polyolefin fiber mats, but only fiber mat 240 that contacts positive electrode 202 may include a conductive layer 242.

Conductive layer 232 and 242 may include similar conductive materials and layers, such as graphene or another material coated onto or applied to the fiber mats, fiber mats made of conductive fibers, and the like, or may include different conductive materials and layers, such as one mat having a conductive coating while the other mat has conductive fibers; or both mats including dissimilar coating or conductive fibers.

In another embodiment, a single fiber mat may include conductive layers on both sides or surfaces of the fiber mat so that both the positive electrode and the negative electrode contact conductive material of one of the respective conductive layers of the single fiber mat.

Figure 3:
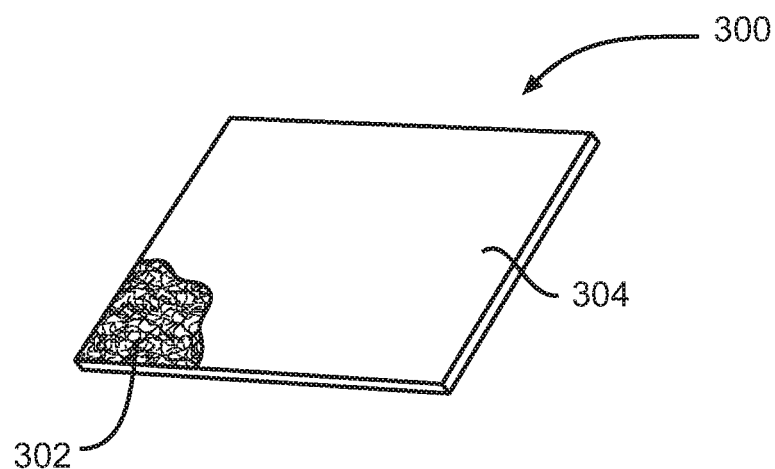
FIG. 3 illustrates a perspective view of a battery separator having a conductive layer or surface according to an embodiment of the invention.

Referring now to FIG. 3, illustrated is a perspective view of a nonwoven fiber mat 300 having a conductive surface 304 along or upon which electrons can flow. A portion of the conductive surface 304 is cut away to reveal a plurality of entangled fibers 302 (e.g., glass fibers) that may be coupled together with a binder to form the nonwoven fiber mat 300. Conductive surface 304 may be a coating of conductive material or a separate mat, film, or screen positioned adjacent a surface of the plurality of entangled fibers 302. Although conductive surface 304 is shown in FIG. 3 as a solid surface or sheet, it should be realized that conductive surface 304 may be a coating on individual fibers (e.g., glass fibers) of fiber mat 300.

In one embodiment, a conductive material (e.g., graphene) is mixed with a primary binder or secondary binder and applied to the plurality of entangled fibers 302 during manufacture of the fiber mat 302 or subsequent thereto. In another embodiment, a conductive fiber mat includes a plurality of entangled conductive fibers coupled together via a binder. Conductive surface 304 may have an electrical resistance of less than about 100,000 ohms per square, and more commonly less than about 50,000 ohms per square, to enable electron flow on the conductive surface 304 of fiber mat 300.

Figure 4:
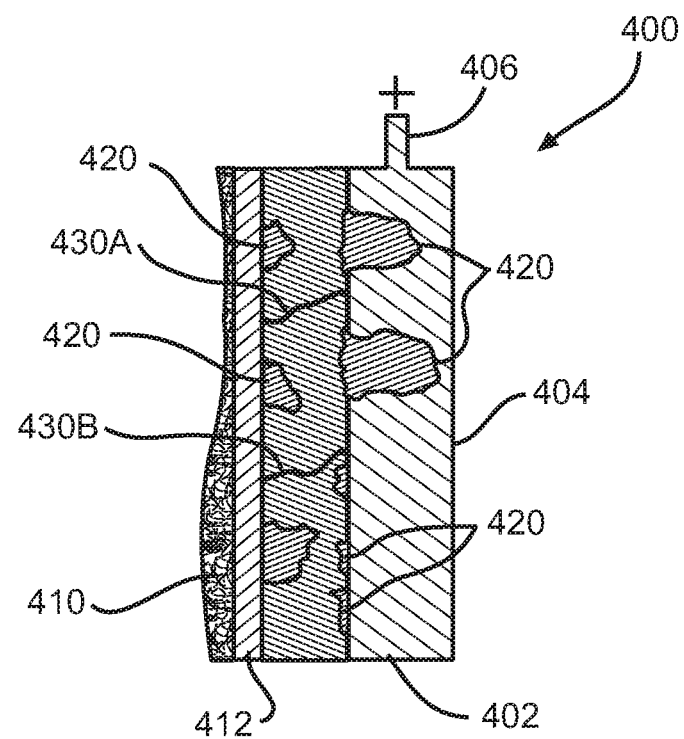
FIG. 4 illustrates an expanded cross section view of a battery cell having a battery separator including a conductive surface or layer according to an embodiment of the invention.

Referring now to FIG. 4, illustrated is an enlarged cross section of a cell 400 of a battery, such as a lead-acid battery. Cell 400 includes a positive electrode conductor 404 electrically coupled with a positive terminal 406. Conductor 404 may have a coating of a positive active material, such as lead dioxide 402. Positioned adjacent the lead dioxide 402 material is a fiber mat 410 have a conductive surface 412 as described above (e.g., a coating, conductive fiber mat, and the like). Cell 400 is immersed in an electrolyte (not shown) and undergoes an electrochemical reaction as a current flow from positive terminal 406 to a negative terminal (not shown). As the electrochemical reaction takes place, lead dioxide 402 is converted into lead sulfate 420 and electrons get generated in layer 402. Lead sulfate 420 is generally an insulator and can form an impervious layer encapsulating lead dioxide 402 particles, which may limit the utilization of the lead dioxide 402. Further, lead sulfate 420 may also result in higher resistance within the battery resulting in decreased electron flow through the positive electrode (e.g., through lead dioxide material 402 and conductor 404) and, thus, reduce current from positive electrode 406 to the negative electrode. For example, lead sulfate 420 can increase the resistance of conductor 404 so that electrons flowing from a bottom region of conductor 404 experience increased resistance. Conductive surface 412 may provide an alternate route or path of less resistance along which the electrons can flow.

Electrons that are produced in lead dioxide 402 around the path 430B can flow to the conductive surface 412 of fiber mat 410 when the resistance between lead dioxide 402 and positive terminal 406 via conductor 404 increases due to the formation of lead sulfate 420. Alternatively, at a different location the resistance between lead dioxide 402 and positive terminal 406 via conductor 404 may be lower than the resistance of conductive surface 412. Thus, path 430A may represent electrons flowing to conductor 404 when lead sulfate 420 develops at a point near conductive surface 412. In this manner, electrons may flow through either or both conductive surface 412 and conductor 404 depending on which conductive material provides the least electrically resistive path. Further, electrons may flow virtually anywhere along conductive surface 412 so that when lead sulfate forms in one region or area, the electrons are able to flow around that region.

For simplicity, cell 400 only shows the positive electrode, although it should be realized that above description may equally apply to the negative electrode.

Figure 5:
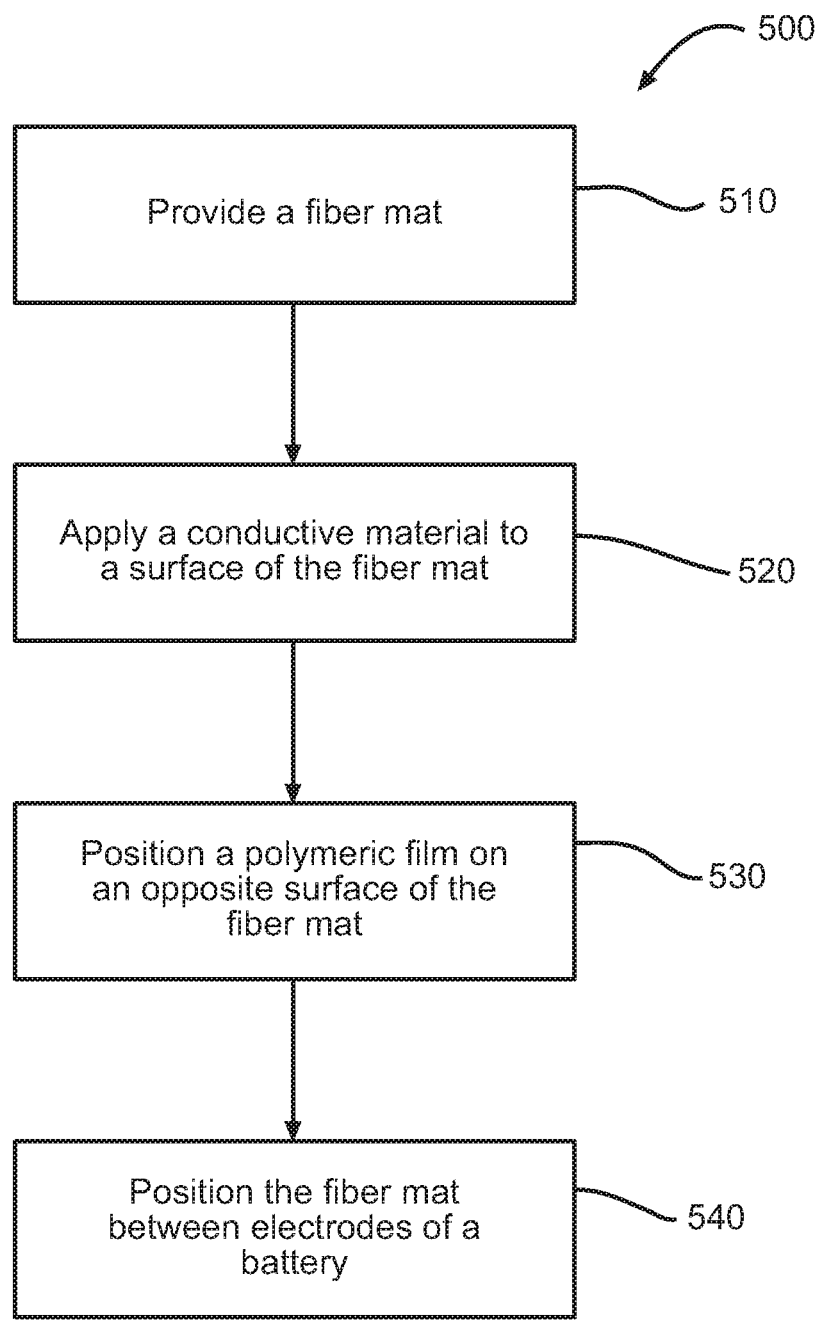
FIG. 5 illustrates a method of providing a battery separator having a conductive surface or layer according to an embodiment of the invention.

Referring now to FIG. 5, illustrated is a method for enhancing or providing electron flow on a surface of a battery separator. At block 510, a fiber mat or battery separator comprising a fiber mat is provided. The fiber mat may include a plurality of fibers (e.g., glass fibers and the like) and may have an electrical resistance of greater than about 1 million ohms per square as described above. At block 520, a conductive material is applied to at least one surface of the fiber mat. The conductive material may have an electrical resistance of less than about 100,000 ohms per square, and more commonly less than about 50,000 ohms per square, and may be applied so that the conductive material forms a conductive layer on the surface of the fiber mat. The conductive layer may enhance electron flow on the surface of the fiber mat. At block 530, a polymeric film or microporous membrane, such as those described above, may be positioned on an opposite surface of the fiber mat (i.e., on a surface opposite the surface the conductive material is applied to). At block 540, the fiber mat (i.e., the battery separator) may be positioned between a positive electrode and a negative electrode of a battery so that the conductive layer contacts one of the electrodes to enhance electron flow with respect to the contacted electrode and/or within the battery.

In one embodiment, applying the conductive material to the surface of the fiber mat may include applying a coating of conductive material to the plurality of fibers of the fiber mat. The coating of conductive material may include a binder mixed with the conductive material. The fiber mat may be saturated with the binder, such as during manufacture of the fiber mat, and/or the binder may be sprayed or applied atop the surface of the fiber mat. In another embodiment, applying the conductive material to the surface of the fiber mat may include positioning a second fiber mat adjacent the surface of the fiber mat, the second fiber mat including a plurality of conductive fibers or a plurality of fibers coated with a conductive material so that the second fiber mat is electrically conductive.

The method may also include positioning a positive electrode conductor adjacent a surface of a positive electrode of a battery and positioning the fiber mat (i.e., battery separator) adjacent the positive electrode so that the conductive layer contacts the positive electrode and so that the positive electrode is disposed between the fiber mat and the positive electrode conductor. The electrons at a first region of the positive electrode may flow along the conductive layer of the fiber mat to a positive terminal of the battery because the conductive layer provides an electrical path of minimal resistance at the first region when compared with an electrical path of the positive electrode conductor at the first region. Likewise, electrons at a second region of the positive electrode may flow along the positive electrode conductor to the positive terminal of the battery because the positive electrode conductor provides an electrical path of minimal resistance at the second region when compared with an electrical path of the conductive layer at the second region.

A test was performed using a standard battery separator (i.e., a battery separator without a conductive layer) and a battery separator described herein having a conductive layer or surface. The test showed improvements in battery life of batteries using the battery separator having a conductive layer or surface. The test was performed as follows: Batteries were constructed having two electrodes, a polymeric film membrane, and a glass fiber mat—1 battery included a glass fiber mat without a conductive surface and 2 of the batteries included a glass fiber mat with a conductive surface. A Proam universal AC-DC adaptor was set at 2.4V and allowed to charge the battery for about 1 hour. The current was recorded. A Multiplex multi-charger LN-5014 was allowed to discharge the battery completely. The charge and discharge steps were repeated for additional cycles. The current-time curve was integrated to determine the capacity (in milliamp-hours).

As mentioned above, two battery separators types were used: a first glass fiber mat battery separator without a conductive surface, and a second glass fiber mat battery separator having the fiber mat coated with Graphene. The glass fiber mats were positioned to contact the positive electrode so that the conductive surface of the second glass fiber mat contacted the positive electrode. Three batteries were tested: 1 battery having a separator without a conductive surface and 2 batteries having separators with conductive surfaces. Each battery was tested for 5 charge and discharge cycles. The results of the test are shown in the table below.

| Type | Calculated capacity (mAH) | Time (min) | Average capacity/min | % Improvement |
|---|---|---|---|---|
| Standard battery mat | 407.6 | 60.07 | 5.90 +/− 0.58 | NA |
|  | 366.83 | 60.03 |  |  |
|  | 347.9 | 60.03 |  |  |
|  | 328.02 | 60.03 |  |  |
|  | 321.22 | 60.03 |  |  |
| Standard battery mat coated w/Graphene (Run 1) | 406 | 60.07 | 6.30 +/− 0.35 | 6.7% |
|  | 369.3 | 60.1 |  |  |
|  | 381.8 | 60.05 |  |  |
|  | 356 | 60.07 |  |  |
| Standard battery mat coated w/Graphene (Run 2) | 419.6 | 60 | 6.31 +/− 0.55 | 7.0% |
|  | 396.9 | 60.02 |  |  |
|  | 387.1 | 60.02 |  |  |
|  | 349.1 | 59.98 |  |  |
|  | 341.1 | 60 |  |  |

As shown in the table, approximately a 7% improvement was observed in the batteries using separators that include the conductive surface or layer. This 7% improvement was observed after just 5 charge/discharge cycles. This preliminary results suggest the possibility of increasing battery cycle life by using battery separators including or having a conductive surface or layer, such as those described herein.

The fiber mats and/or battery separators described herein may generally be referred to as non-conductive mats or mats having neglibigle conductance, non-appreciable conductance, minimal conductance, and the like. It should be realized that non-conductance, negligible conductance, non-appreciable conductance, and the like may not mean an absolute lack of conductance per se, but rather may describe an ability to act or function as an electrical insulator. For example, such mats (i.e., non-conductive, negligibly conductive, non-appreciably conductive, and the like) may have such small conductivity (i.e., such high electrical resistance) that they may be used as an electrically insulative layer between objects, such as battery electrodes, and/or may not provide any measurable or appreciable conductive values. Put another way, such mats may function as and/or measure as an open circuit (i.e., may measure a roughly infinite resistance).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A battery separator comprising:
   a mat including a plurality of electrically insulative fibers, the mat being configured to separate a positive electrode and a negative electrode of a battery to electrically insulate the positive and negative electrodes;
   a primary binder that adheres the electrically insulative fibers together, the primary binder enabling the battery separator to be used in an aqueous electrolyte environment; and
   a conductive material disposed on at least one surface of the mat to form a conductive layer on the at least one surface of the mat, wherein the conductive material contacts at least one of the positive or negative electrodes of the battery, and wherein the conductive material enables electron flow on the surface of the mat;
   wherein the conductive material is a separate material from an active material of the positive electrode and an active material of the negative electrode;
   wherein the conductive material is a coating applied to the plurality of electrically insulative fibers adhered together via the primary binder, the coating comprising a mixture of the conductive material and a secondary binder.

2. The battery separator of claim 1, further comprising a microporous membrane disposed on the opposite surface of the mat.

3. The battery separator of claim 2, further comprising:
   a second mat disposed on an opposite surface of the microporous membrane such that the microporous membrane is sandwiched between the mat and the second mat; and
   a second conductive material disposed on an outer surface of the second mat such that the second conductive material contacts a second electrode of the battery, the second conductive material having an electrical conductivity that enables electron flow on the surface of the second mat.

4. The battery separator of claim 1, wherein the conductive material comprise one or more materials selected from the group consisting of:
   conductive polymers;
   nanocarbons;
   a metal;
   copper;
   titanium;
   vanadium;
   graphite; and
   graphene.

5. The battery separator of claim 1, wherein the mat comprises a glass mat, and wherein the coating is applied to the glass mat.

6. The battery separator of claim 1, further comprising a second mat comprising a plurality of conductive fibers, the second mat being positioned adjacent the mat.

7. A nonwoven fiber mat having a conductive surface, the nonwoven fiber mat comprising:
   a plurality of entangled fibers that form the nonwoven fiber mat;
   a primary binder that couples the plurality of entangled fibers; and
   a layer of conductive material disposed on at least one surface of the plurality of entangled fibers, the conductive material having an electrical conductivity sufficient to provide the conductive surface of the nonwoven glass fiber mat;
   wherein the conductive material is a separate material from an active material of a positive electrode and an active material of a negative electrode of a lead acid battery; and
   wherein the layer of conductive material is a coating applied to the at least one surface of the plurality of entangled fibers, the coating comprising a mixture of the conductive material and a secondary binder.

8. The nonwoven fiber mat of claim 7, further comprising a microporous membrane disposed on the opposite surface of the nonwoven fiber mat.

9. The nonwoven fiber mat of claim 8, further comprising:
   a second nonwoven fiber mat disposed on an opposite surface of the microporous membrane such that the microporous membrane is sandwiched between the nonwoven fiber mat and the second nonwoven fiber mat; and a second conductive material disposed on an outer surface of the second nonwoven fiber mat, the second conductive material having an electrical conductivity that enables electron flow on the surface of the second nonwoven fiber mat.

10. The nonwoven fiber mat of claim 7, wherein the conductive material comprise one or more materials selected from the group consisting of:
   conductive polymers;
   nanocarbons;
   a metal;
   copper;
   titanium;
   vanadium;
   graphite; and
   graphene.

11. The nonwoven fiber mat of claim 7, wherein the nonwoven fiber mat comprises a glass mat, and wherein the coating is applied to the glass mat.

12. The nonwoven fiber mat of claim 7, further comprising a second mat comprising a plurality of conductive fibers, the second mat being positioned adjacent the nonwoven fiber mat.

13. A lead-acid battery comprising:
   a positive electrode;
   a negative electrode; and
   a fiber mat separating the positive electrode and the negative electrode so as to electrically insulate the positive and negative electrodes, the fiber mat comprising:
   a plurality of fibers;
   a primary binder that couples the plurality of fibers; and
   a conductive material disposed on at least one surface of the fiber mat so as to contact the positive or the negative electrode, the conductive material having an electrical resistant less than about 100,000 ohms per square so as to enable electron flow on the surface of the fiber mat
   wherein the conductive material is a separate material from an active material of the positive electrode and an active material of the negative electrode; and
   wherein the conductive material is a coating applied to the at least one surface of the fiber mat, the coating comprising a mixture of the conductive material and a secondary binder.

14. The lead-acid battery of claim 13, wherein the conductive material has an electrical resistant less than about 50,000 ohms per square.

15. The lead-acid battery of claim 13, further comprising a conductive fiber mat positioned adjacent the at least one surface of the fiber mat.

16. The lead-acid battery of claim 15, wherein the conductive fiber mat comprises a plurality of conductive polymers.

17. The lead-acid battery of claim 13, further comprising an additional conductive material disposed on an opposite surface of the fiber mat so that both the positive and negative electrodes contact one of the respective conductive materials.

18. The battery separator of claim 1, wherein the secondary binder is a dilute binder.

19. The nonwoven fiber mat of claim 7, wherein the secondary binder is a dilute binder.

20. The lead-acid battery of claim 13, wherein the secondary binder is a dilute binder.

* * * * *